(12) United States Patent
Kannan et al.

(10) Patent No.: US 10,140,257 B2
(45) Date of Patent: Nov. 27, 2018

(54) METHOD AND APPARATUS FOR CAPTURING AND PROCESSING CONTENT FROM CONTEXT SENSITIVE DOCUMENTS ON A MOBILE DEVICE

(71) Applicant: SYMBOL TECHNOLOGIES, INC., Schaumburg, IL (US)

(72) Inventors: Anu Kannan, Astoria, NY (US); Alan J Epshteyn, Middle Island, NY (US); Duanfeng He, South Setuaket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 180 days.

(21) Appl. No.: 13/957,751

(22) Filed: Aug. 2, 2013

(65) Prior Publication Data
US 2015/0040002 A1 Feb. 5, 2015

(51) Int. Cl.
*G06F 17/20* (2006.01)
*G06F 17/21* (2006.01)
(Continued)

(52) U.S. Cl.
CPC .......... *G06F 17/212* (2013.01); *G06F 3/0482* (2013.01); *G06K 9/00449* (2013.01); *G06K 9/22* (2013.01); *G06K 9/3216* (2013.01)

(58) Field of Classification Search
CPC ......... G06F 17/211; G06F 17/24; G06T 11/60
See application file for complete search history.

(56) References Cited

U.S. PATENT DOCUMENTS 5,864,623 A * 1/1999 Messina .................... G07F 7/08
235/380
7,245,765 B2 7/2007 Myers et al.
(Continued)

FOREIGN PATENT DOCUMENTS

EP 1580666 A2 9/2005
EP 2402884 1/2012
(Continued)

OTHER PUBLICATIONS

L.V. Rasmussen et al: "Development of an Optical Character Recognition Pipeline for Handwritten Form Filds from an Electronic Health Record", Journal of the American Medical Informatics Association, vol. 19, No. el, Sep. 2, 2011, p. e90-e95 No Copy Available.
(Continued)

*Primary Examiner* — Keith Bloomquist
*Assistant Examiner* — Shahid Khan

(57) ABSTRACT

A mobile device captures information from a document. The mobile device selects a template stored in a memory of the mobile device. The selected template describes data content of at least one document. The mobile device then captures an image of a document, determines that the image corresponds to one document described by the selected template by verifying that at least one first region in the image corresponds to a region of the document described by the selected template, identifies at least one region in the image that corresponds with a region in the document described by the selected template, and processes information in the identified region in the image. The mobile device then aggregates application specific information from the processed information and presents the aggregated application specific information to a user program operating on the mobile device.

20 Claims, 9 Drawing Sheets

(51) Int. Cl.
*G06F 3/0482* (2013.01)
*G06K 9/00* (2006.01)
*G06K 9/22* (2006.01)
*G06K 9/32* (2006.01)

(56) References Cited

U.S. PATENT DOCUMENTS

| | | | |
|---|---|---|---|
| 7,311,256 B2 | 12/2007 | Torchalski | |
| 7,454,192 B1* | 11/2008 | Zhu | G06F 17/3087 |
| | | | 379/114.28 |
| 8,311,330 B2 | 11/2012 | Prabhakara et al. | |
| 8,406,531 B2 | 3/2013 | Ramanujapuram et al. | |
| 8,422,994 B2 | 4/2013 | Rhoads et al. | |
| 2005/0121520 A1 | 6/2005 | Yamaguchi et al. | |
| 2006/0050996 A1* | 3/2006 | King | H04N 1/00244 |
| | | | 382/312 |
| 2006/0161646 A1 | 7/2006 | Chene et al. | |
| 2006/0245555 A1* | 11/2006 | Makela | G06F 17/243 |
| | | | 379/88.12 |
| 2006/0271519 A1 | 11/2006 | Blackwood et al. | |
| 2008/0147790 A1 | 6/2008 | Malaney et al. | |
| 2009/0048820 A1* | 2/2009 | Buccella | G06F 17/289 |
| | | | 704/2 |
| 2009/0125529 A1 | 5/2009 | Vydiswaran et al. | |
| 2009/0185737 A1 | 7/2009 | Nepomniachtchi | |
| 2009/0196529 A1 | 8/2009 | Su et al. | |
| 2009/0276240 A1 | 11/2009 | Haskell et al. | |
| 2010/0260426 A1 | 10/2010 | Huang et al. | |
| 2010/0302604 A1 | 12/2010 | Kodimer et al. | |
| 2011/0131482 A1* | 6/2011 | Shteinvil | G06F 17/218 |
| | | | 715/229 |
| 2011/0182508 A1 | 7/2011 | Ives et al. | |
| 2011/0215154 A1 | 9/2011 | He | |
| 2011/0246457 A1* | 10/2011 | Dong | G06Q 10/06 |
| | | | 707/725 |
| 2011/0249905 A1 | 10/2011 | Singh et al. | |
| 2012/0051649 A1 | 3/2012 | Saund et al. | |
| 2012/0072835 A1* | 3/2012 | Gross | G06Q 10/10 |
| | | | 715/243 |
| 2012/0183172 A1 | 7/2012 | Stroila | |
| 2013/0108115 A1 | 5/2013 | Hwang et al. | |
| 2014/0081951 A1* | 3/2014 | Greenspan | H04L 63/102 |
| | | | 707/722 |
| 2015/0040001 A1 | 2/2015 | Kannan et al. | |
| 2015/0040002 A1 | 2/2015 | Kannan et al. | |

FOREIGN PATENT DOCUMENTS

| | | |
|---|---|---|
| EP | 2402884 A2 | 1/2012 |
| WO | 2007113462 | 10/2007 |
| WO | 2007113462 A1 | 10/2007 |
| WO | 2008127443 A1 | 10/2008 |

OTHER PUBLICATIONS

International Search Report and Written Opinion dated Nov. 10, 2014 in counterpart PCT application No. PCT/US2014/047819.
Gingrande, A., "Automated Forms Processing," IMERGE Consulting, Inc, Jan./Feb. 2005, 8 pages.
"Forms Processing," Wikipedia, accessed at http://en.wikipedia.org/wiki/Forms_processing, accessed on Feb. 10, 2012, pp. 3.

* cited by examiner

METHOD AND APPARATUS FOR CAPTURING AND PROCESSING CONTENT FROM CONTEXT SENSITIVE DOCUMENTS ON A MOBILE DEVICE

BACKGROUND OF THE INVENTION

Users in various fields, for instance, the transport and logistics sector, the postal sector, the government, the financial sector, or the retail sector, rely on a varied set of documents for daily functions. A single document such as a driver's license, a passport, a bill of lading form, or a shipping receipt may include various kinds of information. For example, a driver's license includes a photo section; one or more text sections with the driver's name, address, and features, such as height, weight, and hair color; and a graphics section with the driver's signature. Information may be captured from these documents with a mobile device and presented to a remote processor for further analysis and processing. The remote processor may thereafter send the processed information to a user application operating on the mobile device or operating on a remote device. The user application may then use the processed information to provide application specific information to a user operating the mobile device.

Mobile devices, such as, smart phones, tablets, and personal digital assistants now include increased processing power. For instance, similar to a personal computer or laptop, current mobile devices may include one or more processors for executing operating code and user applications, expanded memory for storing data and operating instructions, and one or more communication ports for connecting a mobile device to external devices. Therefore, the process where information captured on the mobile device is sent to a remote processor for further processing before that information is presented to the user is likely to increase the time and processing cost associated with retrieving, transcribing, and processing the information captured on the mobile device. In addition, sending captured information from the mobile device to the remote processor may hinder or eliminate real-time user interaction and/or feedback.

Accordingly, there is a need for an improved method and apparatus for capturing and processing content from documents on a mobile device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
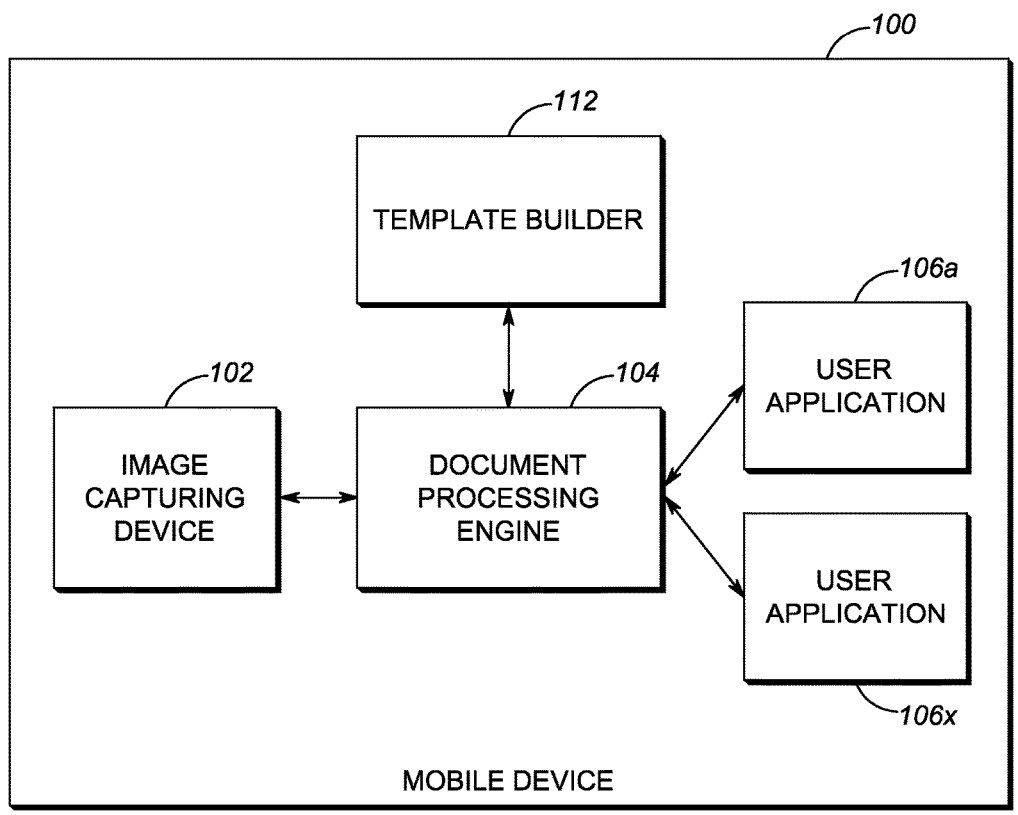
FIG. 1 is a block diagram of a mobile device configured to capture and process information from various documents used in different sectors in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and method for capturing and processing an image of a document on a mobile device. The mobile device selects, based on at least one run-time characteristic of the mobile device, a template stored in a memory of the mobile device. The selected template describes data content of at least one document. The mobile device captures an image of a document, and determines that the image corresponds to one document described by the selected template by verifying that at least one first region in the image corresponds to a region of the document described by the selected template. The mobile device identifies at least one region in the image that corresponds with a region in the document described by the selected template and processes information in the identified region in the image based on at least one of the operating condition at the mobile device or the contextual information in the document. The mobile device aggregates application specific information from the processed information based on at least one of the operating condition at the mobile device or contextual information in the document. The mobile device then presents the aggregated application specific information to a user program operating on one of the mobile device and a remote device connected with the mobile device.

FIG. 1 is a block diagram of a mobile device configured to capture and process information from various documents used in different sectors in accordance with some embodiments. Mobile device 100 includes an image capturing device 102, a document processing engine 104, and one or more user applications 106 (i.e., 106a and 106x). Mobile device 100 may be, for example, a mobile phone, a smart phone, a tablet, a personal digital assistant or other handheld computing device. Image capturing device 102 may be, for example, a camera or other recording device configured to capture information from a document or configured to capture an image of the document. Data processing engine 104 is configured to obtain the image or information captured by image capturing device 102, extract meaningful data from the captured information or image, process the extracted data, and provide application specific information to one or more user applications 106 for further processing by the user application(s). Subsequent to receiving information from the data processing engine 104, each user application 106 may present application specific information on the mobile device 100.

In some embodiments, the mobile device 100 is communicatively coupled via, for example, a communication port (not shown) on the mobile device 100, with a template builder. In other embodiments, the mobile device 100 includes a template builder 112, as shown in FIG. 1. The template builder 112 is configured to create, store and/or present one or more templates, each of which is associated with at least one document. Each template includes fields that correspond to one or more regions of interest in the at least one document. Therefore, each template provides a format that describes one or more regions of interests, either spatially or by content, in the associated document(s). A single document may be associated with more than one template, where the fields in each template associated with the document may be associated with at least one specific region of interest in the document. A single template may also be associated with more than one document, where the template includes fields that correspond with at least one region of interest in each associated document. Prior to the image capturing device 102 obtaining an image of a document, at least one template is stored in a memory of the mobile device 100. The stored template describes the data content and/or format in at least one region of interest in a corresponding document. When an image of the document is captured by the image capturing device, the data processing engine 104 is configured to determine that the image corresponds with a document described by the selected template by, for example, verifying that at least one region in the captured image corresponds to the document described by the selected template.

A document may be any standard document or form used in a specific sector, such as the government or any business sector. Non-limiting examples of sectors include transport and logistics, airlines, postal, manufacturing, healthcare, financial, retail, and utilities sectors. Non-limiting examples of documents used in these sectors include a check, an identity card such as a driver's license or a passport, a bill of lading form, a drug prescription form, or a shipping receipt. In addition, a document may be a non-standard document or form used by one particular company or government agency. Each document may include multiple regions of interest, each of which includes certain type of information. Each region in the document may be defined by its location in the document, size, the type of information it includes (for example, printed characters, barcodes or check boxes), and/or the syntax of the data (for example, alpha/numeric, capital/lower case, or specific characters). Non-limiting examples of types of information that may be included in each region include barcodes, texts, check boxes, graphics, and/or images. Accordingly, each document may be uniquely identified by the regions in the document and the character attributes or fields in a region may be used to identify the region.

Figure 2:
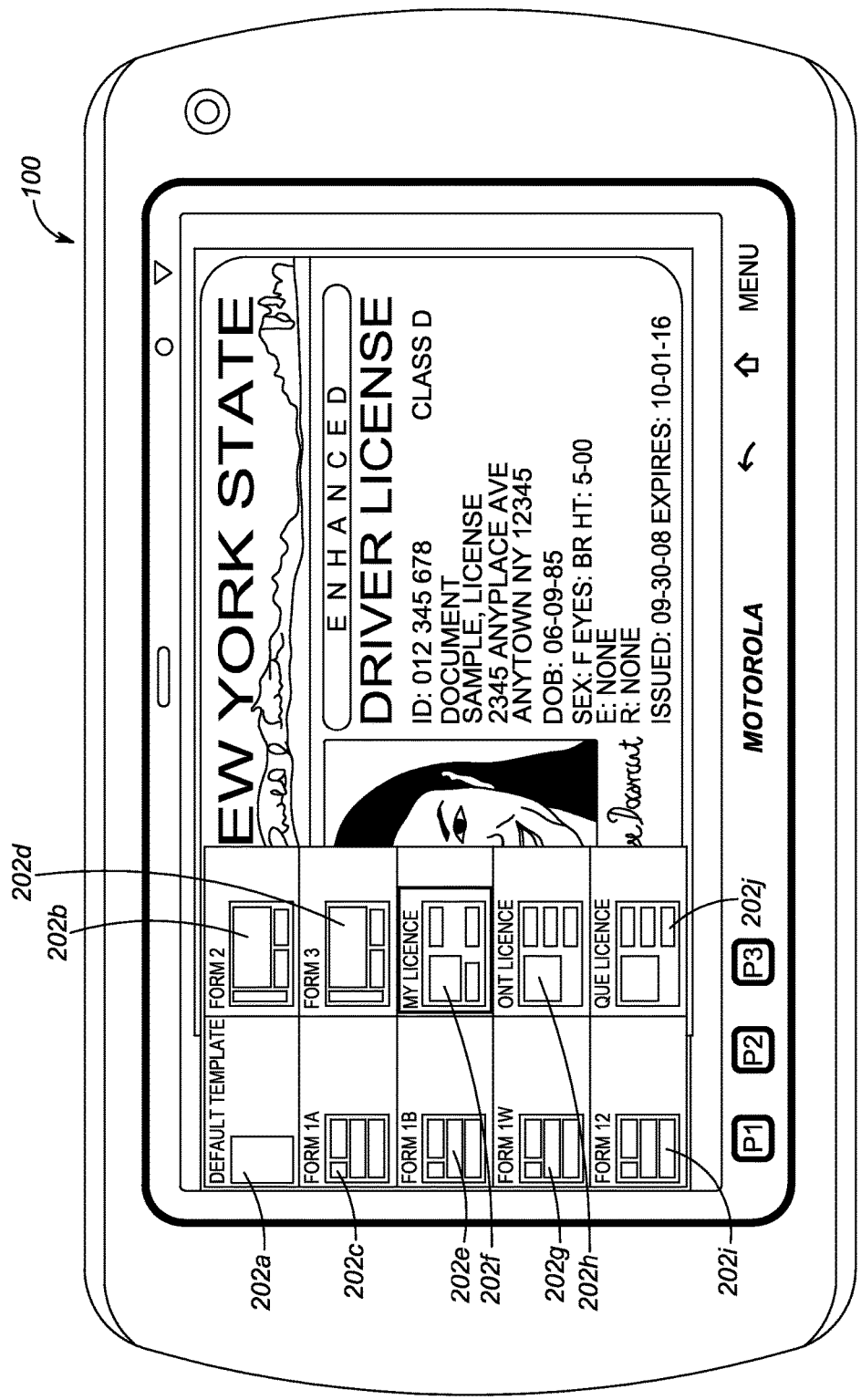
FIG. 2 is a diagram of how a template is associated with a document in accordance with some embodiments.

FIG. 2 is a diagram of how a template is associated with a document in accordance with some embodiments. The mobile device 100 captures an image of a driver's license and, in some embodiments, templates 202 (i.e., templates 202a-202j) associated with the driver's license are stored in a memory of the mobile device 100. The templates may be displayed on the mobile device 100. The user may select one template, for example, template 202f that is to be associated with the document. In other embodiments, the data processing engine 104 may automatically select template 202f and associate that template with the document. The data processing engine 104 is configured to determine that the captured image of the driver's license corresponds with one document defined or described by the selected template by verifying, for example, that at least one field in the captured image of the driver's license corresponds to a region in the document described by the selected template 202f.

Figure 3A:
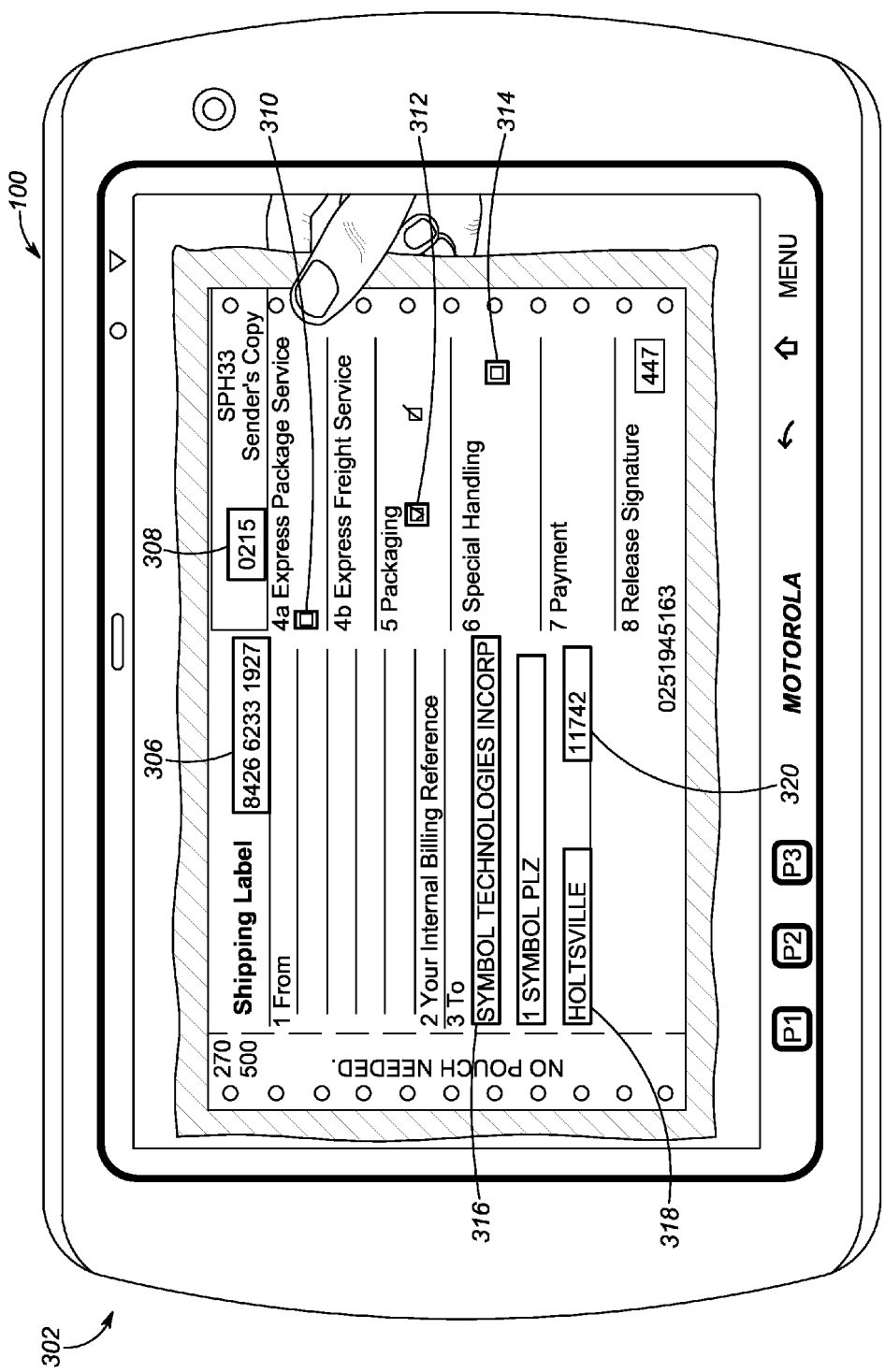
FIG. 3A and FIG. 3B illustrate how predefined information is retrieved from a document based on a selected template in accordance with some embodiments.
Figure 3B:
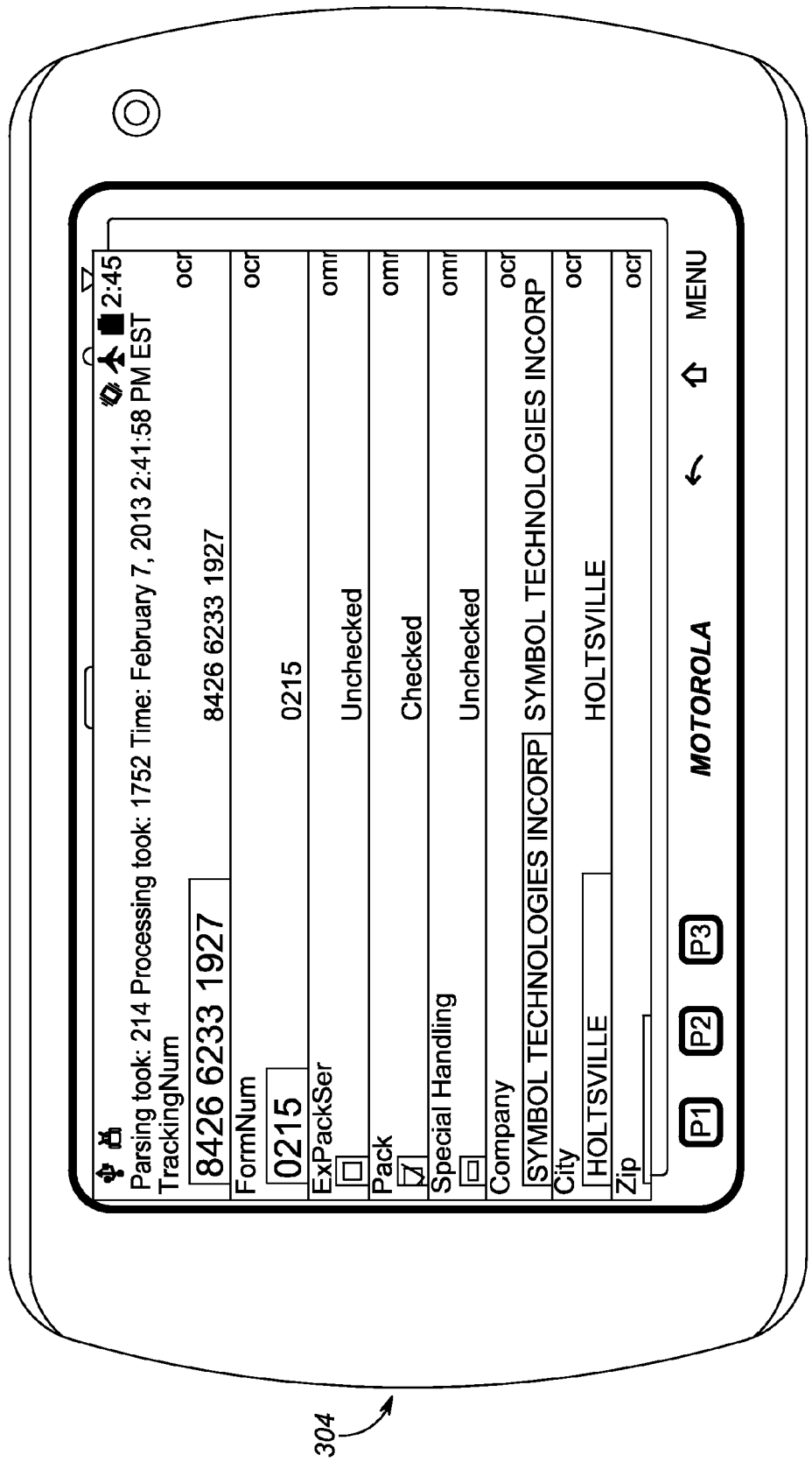

FIG. 3A and FIG. 3B illustrate how predefined information is retrieved from an image of a document based on a selected template in accordance with some embodiments. In 302, the mobile device 100 captures an image of a shipping document. Based on the template associated with the shipping document, as shown at 304, the mobile device 100 retrieves information from the document associated with a tracking number (TrackingNum) 306, a form number (FormNum) 308, a express package service field (ExPackSer) 310, a packaging field (Pack) 312, a Special Handling field 314, a Company name field 316, a City field 318 and a Zip field 320. The data processing engine 104 may then qualify different regions of interest in the image, i.e., the data processing engine 104 recognizes text strings from regions including text, processes images from regions including pictures, or convert check boxes to numerical values. For example, the data processing engine 104 may convert the information associated with the check boxes, i.e., the information associated with the ExPackSer t field 310, the Pack field 312, and the Special Handling field 314, to appropriate numerical values representing, for example, "yes" or "no". Rather than merely pointing the user application to the region in the document with the check box and assuming that the user application is configured to accurately interpret the values associated with the check box, the data processing engine 104 may thereafter send the numerical value for a specific check box to a user application 106. This is particularly beneficial when a document includes multiple barcodes because the data processing engine 104 is configured to reference individual data such as a serial number and/or stock keeping units associated with each barcode and the data processing engine 104 returns required data in a usable format to a user application for immediate use.

Figure 4:
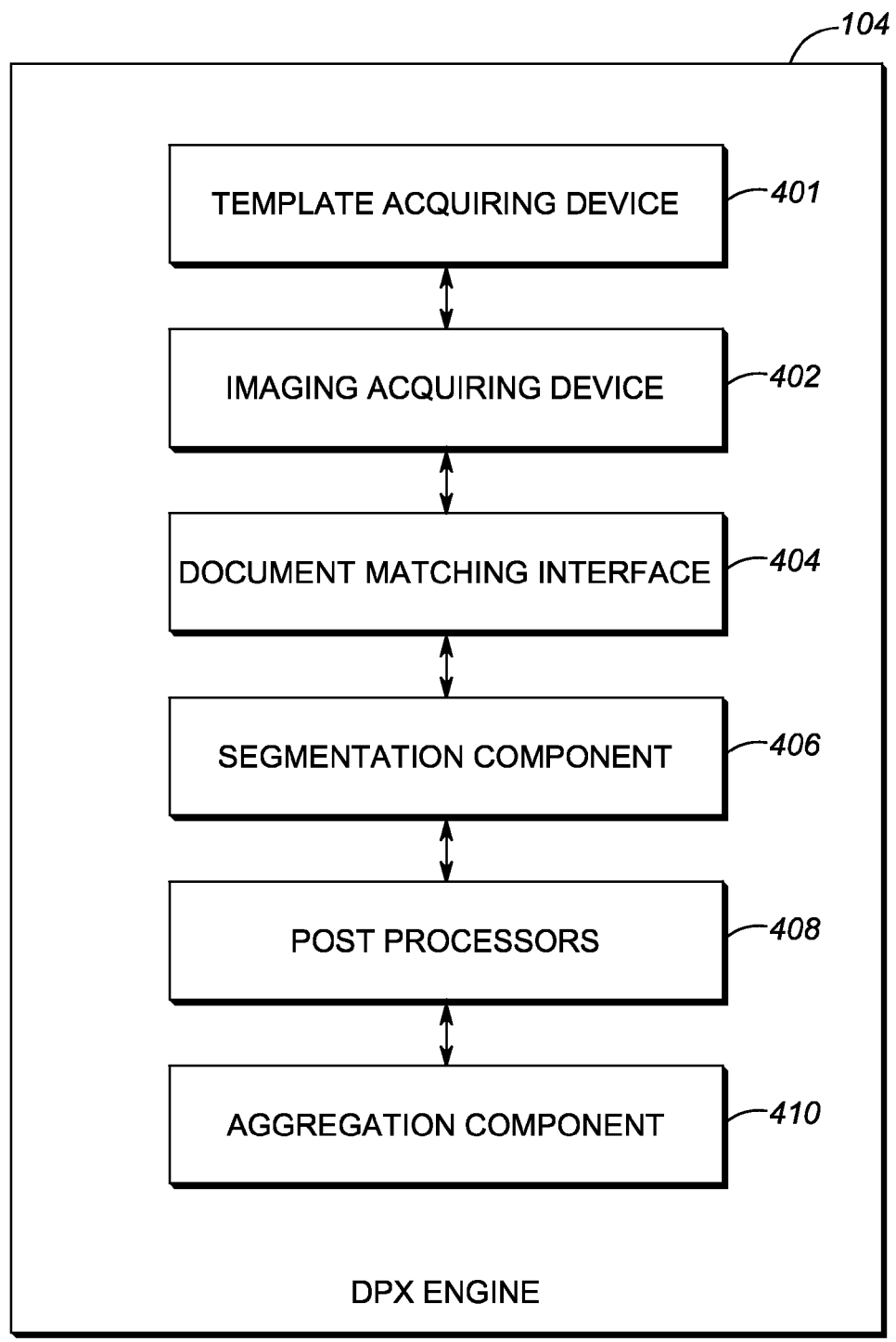
FIG. 4 is a block diagram of a document processing engine used in accordance with some embodiments.

FIG. 4 is a block diagram of the document processing engine used in accordance with some embodiments. The data processing engine 104 includes a template acquiring device 401, an image acquiring device 402, a document matching interface 404, a segmentation component 406 (also referred to as an image processing engine), one or more post processors 408 and an aggregation component 410. The template acquiring device 401 selects a template stored in a memory of the mobile device 100. The selected template describes data content and/or format of at least one document. The template acquiring interface 401 may provide a user interface that is used in selecting the stored template retrieved from the template builder 112. In other embodiments, based on the contextual data of a document described by a stored template, template acquiring interface 401 may dynamically select an appropriate template from a set of stored templates. The selected template therefore includes parameters or fields that correspond to the region(s) of interest in at least one document described by the template.

Image acquiring device 402 is configured to retrieve information captured from one or more regions of interest in a document or a captured image of the entire document. In some embodiments, the captured information or image may be stored in a memory on the mobile device and used to process another template or document. The captured information or image is sent to document matching interface 404 to determine whether or not the captured image corresponds to one document described by the selected template. In some embodiments, the determination is made by verifying that at least one region in the captured image corresponds to a region in the document described by the selected template. In matching the captured image to the selected template, the document matching interface 404 may decode one or more barcodes obtained from a barcode region of the document and capture the pictures of the one or more barcodes simultaneously in one "decode session". A decodes session may involve a single action (such as a user pressing a "trigger" on the mobile device). The document matching interface 404 may also recognize alphanumeric characters from a text region of interest in the document. The document matching interface 404 may also generate a mathematical model that describes needed cropping and other rectification that is to be performed on one or more regions in the captured image.

By matching the captured information or image to a retrieved template, the data processing engine 104 is able to specify the document characteristics, identify the document type, and the processing requirements. In other words, each template's parameters provide information on how to process an associated region in the documents. For example, a template parameter associated with a barcode region in a document can provide information on which barcode symbologies are to be decoded. Similarly, a template parameter associated with a text region in a document can provide information on what type of text (for example, numeric only or alphanumeric) should be in the text region in the document. Accordingly, the template parameters provide information on how to process at least a portion of the document and/or how to process the entire document.

The captured information or image is sent to the segmentation component 406 which identifies various regions in the document based on, for example, the layout of the selected template or by processing information in the various regions. When, for example, the captured image is subjected to perspective distortion, the segmentation component 406 locates each region of interest within the image. The segmentation component 406 may use the mathematical model, provided by the document matching interface 404, to transform the location parameters in one or more regions in the captured image, to find locations in a distorted image, and/or to construct a rectified image of a region. Based on an associated field in the selected template, the segmentation component 406 may recognize the size and location of each field in a captured image and the segmentation component may decide which portions of a field is to be extracted, have its distortion corrected, and sent to a post processor.

The segmentation component 406 sends the processed information for each the identified regions to one or more post processors 408 for further analysis and processing. Non limiting examples of the post processors 408 include an Optical Character Recognition (OCR) processor, an Optical Mark Recognition (OMR) processor, an image sharpening processor, a text to speech processor, an object recognition processor, and a custom decoder such as a license plate recognition processor. The OCR processor is configured to convert scanned images of handwritten or printed text into machine-encoded text. The OMR processor is configured to recognize checked marks. The image sharpening processor is configured to enhanced an image or further process an image retrieved from the document. The text to speech processor is configured to convert text to audio. It should be noted that the same information may be processed by the segmentation component 406 and one or more post processors 408.

Subsequent to processing the captured information, post processors 408 present the processed data to aggregation component 410. The aggregation component 410 aggregates application specific information sent by the post processors 408 and the aggregation component 410 may attach a label as specified by the template, for example, name or age, to the application specific information. The aggregation component 410 may then present the application specific information to a user operating the mobile device, for example, for validation and/or may send the application specific information to one or more user applications 106 operating on the mobile device 100 or operating on a remote device coupled to the mobile device. Each user application 106 thereafter uses the provided information to present application specific information on the mobile device 100. In some embodiments, the aggregation component 410 is configured to return a predefined set of data regardless of the type of document from which the data was retrieved. For example, the aggregation component 410 may return a name, an age, and an address to a user application configured to validate an identity, regardless of whether the information is retrieved from a driver's license, a passport, or a different identification document.

Accordingly, subsequent to receiving information from the aggregation component 410, a postal user application operating on the mobile device 100, for example, may further process the received information to validate a postal address at a point of pickup of a parcel or obtain an image on a signature field on a postal receipt. The aggregated application specific information may be associated with predefined confidence levels. Consider an example where subsequent to receiving information from the aggregation component 410, a shipping user application operating on the mobile device may receive aggregated information to validate a shipping label and ensure that information provided by the aggregation component 410 is valid. If the aggregated information is associated with a confidence level beyond (for example, above) a predefined threshold, the shipping user application operating on the mobile device may further validate an address on a shipping label. If, on the other hand, the aggregated information is associated with a confidence level beyond (for example, below) the predefined threshold, the shipping user application operating on the mobile device may indicate to the user that additional information is needed from the user.

The processing of the data on the mobile device 100, i.e., from the template picked to the intrinsic post processing of the regions of interest, may correspond to the contextual data being executed on the mobile device, sensors operating on the mobile device and/or other operating conditions on the mobile device (collectively referred to herein as the run-time characteristics of the mobile device 100). For instance, if the mobile device 100 is executing an application that is connected to an ad-hoc network via, for example, Wi-Fi protocol, the presence of a certain Wi-Fi network may cause the template acquiring device 401 to select a particular template. Consider an example where a network signal, such as the bandwidth of the Wi-Fi network affects the compression ratio of a region containing a picture. The presence of the Wi-Fi network may therefore cause the template acquiring device 401 to select an appropriate template that can handle the affected compression ratio. Consider another example where a global positioning satellite (GPS) location application is being executed on mobile device 100. If the GPS location of mobile device 100 is determined to be, for example, Germany, the document matching interface 404, the segmentation component 406 and/or an OCR post processor 408 may recognize alphanumeric characters, including German characters such as umlaut, from text region(s) of interest in a captured image.

In some embodiments, depending on the application, the run-time characteristics of mobile device 100 also may be used to make certain predictions. For example, a determined location of the mobile device 100 could be compared against a list containing previously recognized values at that location. With this example, a postal or shipping application being executed on mobile device 100 may use information received from the aggregation component 410 to automatically validate a postal address. In addition, the mobile device 100 may further process regions in the document based on the location of the mobile device, for example, the orientation of the mobile device or on the proximity of the mobile device to the document. Furthermore, the post processors 408 can be customized for a specific sector. For example, in the postal sector, an additional post processor may be used for text/address translation. A user interface on the mobile device 100 may be augmented with the required interaction to accurately identify/validate regions in a captured document for immediate user feedback. For example, given a parsed image, the user interface on the mobile device 100 may be augmented to receive a prompt to use OCR text or accept a decoded barcode data in a region when that region of the user interface is touched. The user interface on the mobile device 100 may be further augmented to receive a prompt that identifies required information via certain characteristics, for example, color.

In some embodiments a single activation, for example, pressing a button or trigger, of an imager associated with the image capture device 102 may activate certain features in the mobile device 100. Subsequent to triggering activation, operation of the mobile device 100 may depend on the context of the captured image or other run-time characteristics of the mobile device 100. For example, subsequent to triggering activation, the mobile device 100 may decode barcode data, if any is found in the document; the mobile device 100 may also determine what type of document or form is captured, examine regions of interest (sub-areas) on demand, and provide other context data (for example, GPS data, network connectivity information or day-time stamp) on demand. In some embodiments, before activation is triggered, rules may be predefined and loaded into a user application operating on the mobile device 100 or the data processing engine 104. The data processing engine 104 can thereafter process the rules and provide context data as needed. The context data may not be used or incorporated by the data processing engine 104 until required by the predefined rules. For instance, a GPS feature may be turned off to save power until that feature is required when the predefined rules are executed.

Accordingly, depending on the run-time characteristics and/or the activity performed by the mobile device 100 when activation is triggered, certain of the predefined rules may be carried out. Consider an example where subsequent to triggering activation, the mobile device 100 may scan, for example, a shipping form, decode barcode data, if any is found in the shipping form, obtain an address either from the form or from pre-loaded data, and determine that the address is not near a reported GPS location. In response to this determination, the user application operating on the mobile device 100 may route a package associated with the scanned form to an address displayed on a navigation unit. However, if subsequent to triggering activation, the mobile device 100 determines that the address is a reported GPS location and the signature field on the form is unsigned, the user application operating on the mobile device may display an alert to request a signature. Furthermore, if subsequent to triggering activation the mobile device 100 determines that the address is a reported GPS location, the signature field on the form is signed, and the mobile device 100 is connected to a cellular network, the user application operating on the mobile device 100 may upload a digitized signature with a tracking number to a remote computer, for example, a server. In another example, if subsequent to triggering activation the mobile device 100 determines that the address is a reported GPS location, the signature field on the form is signed, and the mobile device 100 is connected to a Wi-Fi network, the user application operating on the mobile device may upload a complete digitized form with the signature and a tracking number to a remote computer, for example, the server. In each of these examples, certain predefined rules or actions are only executed in response to the run-time characteristic and/or the activity performed by the mobile device 100.

In some embodiments, depending on the application, the data context and/or run-time characteristics of the mobile device 100 also may be used to choose between different user programs operating on the mobile device and/or the processing steps implemented by the mobile device. Consider an example where a delivery form is scanned and captured by a mobile device after the form is signed by a customer. If the connection between the mobile device and an associated network is limited or otherwise compromised, the mobile device may send a signal to a server indicating that a delivery was made at a particular time and location. However, because of the run-time characteristics of the mobile device (i.e., the slow network connection), the mobile device may save the images (of the signature, or the whole signed form) and transmit the saved images at a later time when the network connection is improved. On the other hand, if the network connection is "normal" (i.e., not compromised), based on the run-time characteristics of the mobile device, the data processing engine 104 may send the images together with the other data to the server. Accordingly, the run-time characteristics of the mobile device may be used to select a template, choose the processing steps performed by the mobile device, and/or select a user application.

The data processing engine 104 may be communicatively coupled to one or more components (not shown), for example middleware systems or user applications that may be configured to receive data from the image capture device 102 and provide the data to a non-scanning aware user application. Therefore, information processed by data processing 104 may either be transmitted directly to a user application or the information may be sent to these middleware systems or user applications.

Figure 5:
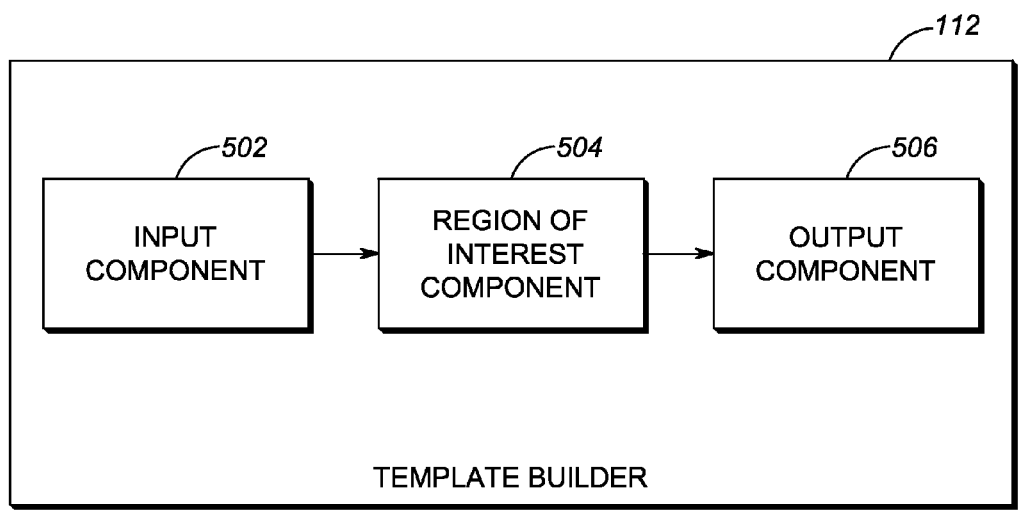
FIG. 5 is a block diagram of a template builder used in accordance with some embodiments.

FIG. 5 is a block diagram of a template builder used in accordance with some embodiments. Template builder 112 includes an input component 502, region of interest component 504, and an output component 506. The input component 502 is configured to receive a static image of the document. The region of interest component 504 provides an interactive interface that may be used to identify regions of interest in the document. The region of interest component 504 is configured to interpret each identified region of interest so that each identified region may be associated with an appropriate post processor 408. For example, a text region of interest may be associated with an OCR processor. The region of interest component 504 may also enable validation to ensure that each identified region is accurately associated with the appropriate post processor 408. For example, OCR, OMR and picture regions in a document, such as a passport, may be determined based on their location in the passport. If the document includes multiple barcodes, these regions may be identified based on their content or the associated symbology.

The region of interest component 504 further enables each identified region to be qualified. For example, a region in the document may be qualified as an identifier or as a required field. Those regions qualified as identifiers are required to accurately identify a form in the template and the data in those regions may or may not be sent to a post processor for further analysis. Those regions qualified as identifiers may be used to provide meta-data about the document. The output component 506 is configured to generate a template, for example, in the form of an XML file.

Template builder 112 may further include information that can be used by data processing engine 104. In some embodiments, subsequent to capturing information in a document, the data processing engine 104 can inform the mobile device 100 that a document has been found and the type of processing to be applied in certain conditions. For example, the data processing engine 104 can inform the mobile device 100 whether or not a barcode in the document is to be decoded based on the field in the template associated with the barcode in the document. Furthermore, the data processing engine 104 may rectify a captured image from the document based on the field in the template associated with the image in the document. For example, the data processing engine 104 may remove perspective distortion and record the rectified image as a mathematical mapping. The stored mapping between the rectified image and original image may allow for the computation of areas for cropped fields. Delayed processing of the original document may avoid processing of the document altogether, because once the document's salient fields are extracted, the document itself may most likely not be needed any further. This results in speedier processing of the document. Based on the characteristics of the fields in a template, the regions in the document associated with the fields in the template may be sent to one or more post processors 408.

When, for example, the mobile station 100 is being used in the transportation and logistics sector, the mobile device 100 may be used to extract and process information from, for example, a bill of lading form, a shipping invoice or shipping receipt and provide the processed information to a user application operating on the mobile station 100. The user application may thereafter further process the information received from the mobile device 100 to, for example, read and identify a container ID, handle delivery pickup, handle payments, handle exceptions like correcting charges to an incorrect account number, or handle a loading error due to an incorrect label. In another example, in the retail sector, the mobile station 100 may extract and process information from an image of a shelf setup or a pallet to decode all the barcodes and texts on items on the shelf in a single session. The decoded information may then be sent to a user application for the user application to locate an item on the shelf. In a further example, the mobile station 100 may extract and process information from multiple barcodes and contract forms and provide this information to a user application configured to perform checkout operations. The mobile station 100 is also configured to extract and process information from an identity card and use the processed information to auto-populate forms. In a further example mobile station 100 is also configured to extract and process information obtained from a health insurance card and other health forms and provide the extracted information to a user application configured to update patient information.

Figure 6:
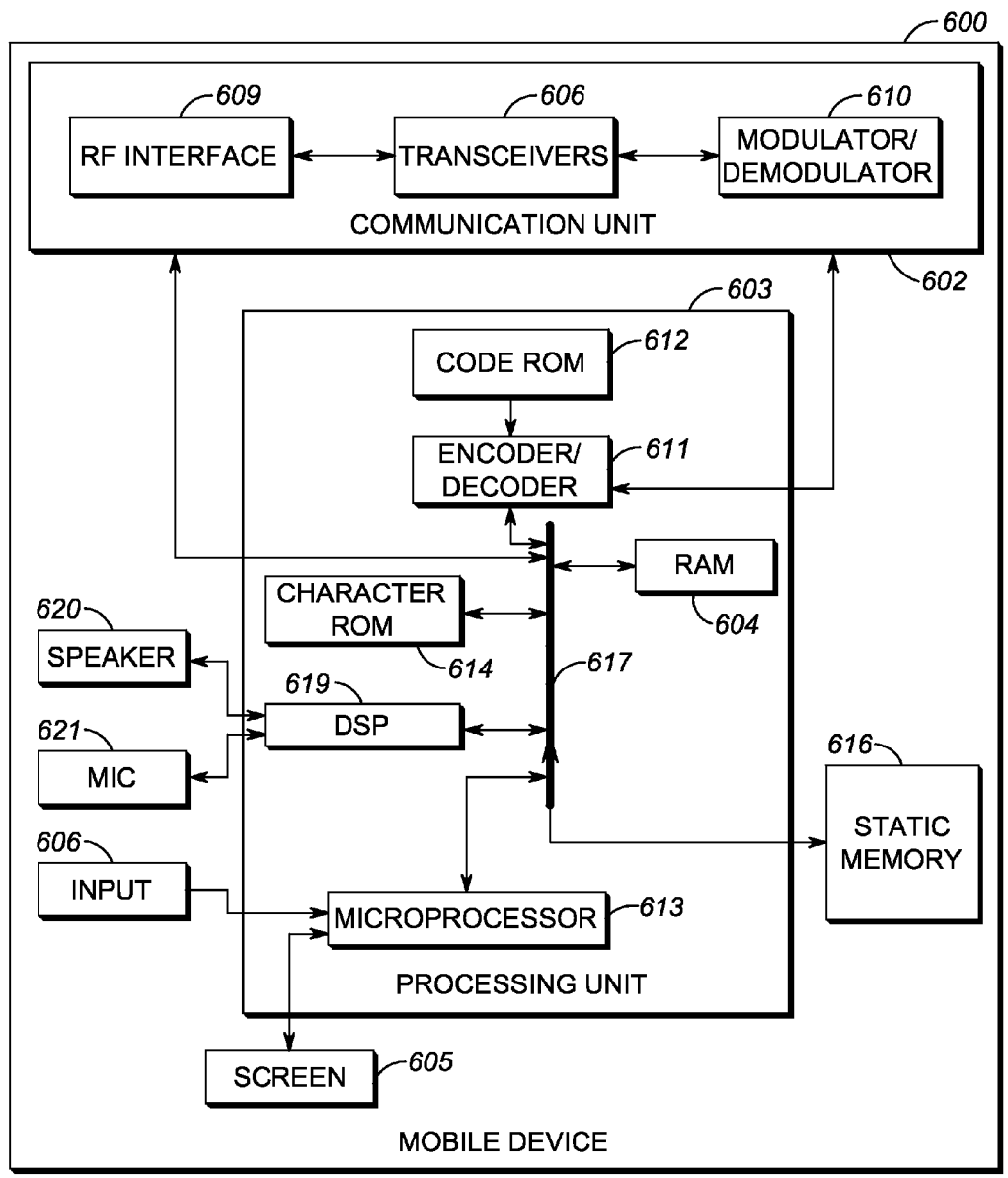
FIG. 6 is a block diagram of a mobile device used in accordance with some embodiments.

FIG. 6 is a block diagram of a mobile device used in accordance with some embodiments. The mobile device 600 includes a communications unit 602 coupled to a common data and address bus 617 of a processing unit 603. The mobile device 600 may also include an input unit (e.g., keypad, pointing device, mouse, etc.) 606, an output transducer unit (e.g., speaker) 620, an input transducer unit (e.g., a microphone) (MIC) 621, and a display screen 605, each coupled to be in communication with the processing unit 603.

The processing unit 603 may be configured to perform the functions of the data processing engine 104. The processing unit 603 may also include an encoder/decoder 611 with an associated code ROM 612 for storing data for encoding and decoding voice, data, control, or other signals that may be transmitted or received by the computing device. The processing unit 603 may further include a microprocessor 613 coupled, by the common data and address bus 617, to the encoder/decoder 611, a character ROM 614, a RAM 604, and a static memory 616. The processing unit 603 may also include a digital signal processor (DSP) 619, coupled to the speaker 620, the microphone 621, and the common data and address bus 617, for operating on audio signals received from one or more of the communications unit 602, the static memory 616, and the microphone 621.

The communications unit 602 may include an RF interface 609 configurable to communicate with network components, and other user equipment within its communication range. The communications unit 602 may include one or more broadband and/or narrowband transceivers 608, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 602 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 610 that is coupled to the encoder/decoder 611. The character ROM 614 stores code for decoding or encoding data such as control, request, or instruction messages, channel change messages, and/or data or voice messages that may be transmitted or received by the mobile device. Static memory 616 may store operating code associated with operating the mobile device.

Figure 7:
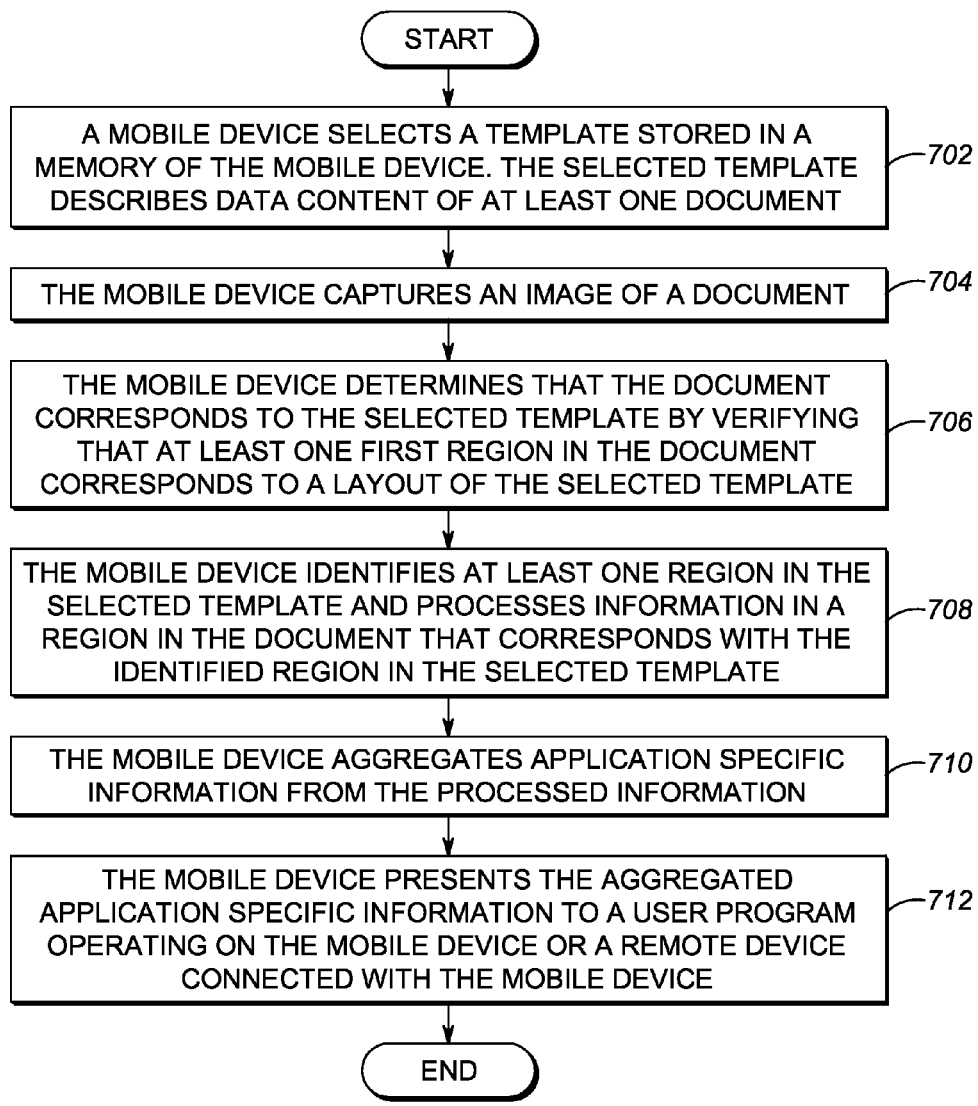
FIG. 7 is a flow diagram of steps used in accordance with some embodiments.

FIG. 7 is a flow diagram of steps implemented in accordance with some embodiments. At 702, a mobile device selects a template stored in a memory of the mobile device. The selected template describes data content of at least one document. At 704, the mobile device captures an image of a document. At 706, the mobile device determines that the image corresponds to one document described by the selected template by verifying that at least one first region in the image corresponds to a region of the document described by the selected template. At 708, the mobile device identifies at least one region in the image that corresponds with a region in the document described by the selected template and processes information in the identified region in the image. At 710, the mobile device aggregates application specific information from the processed information. At 712, the mobile device presents the aggregated application specific information to a user program operating on the mobile device or a remote device connected with the mobile device.

Figure 8:
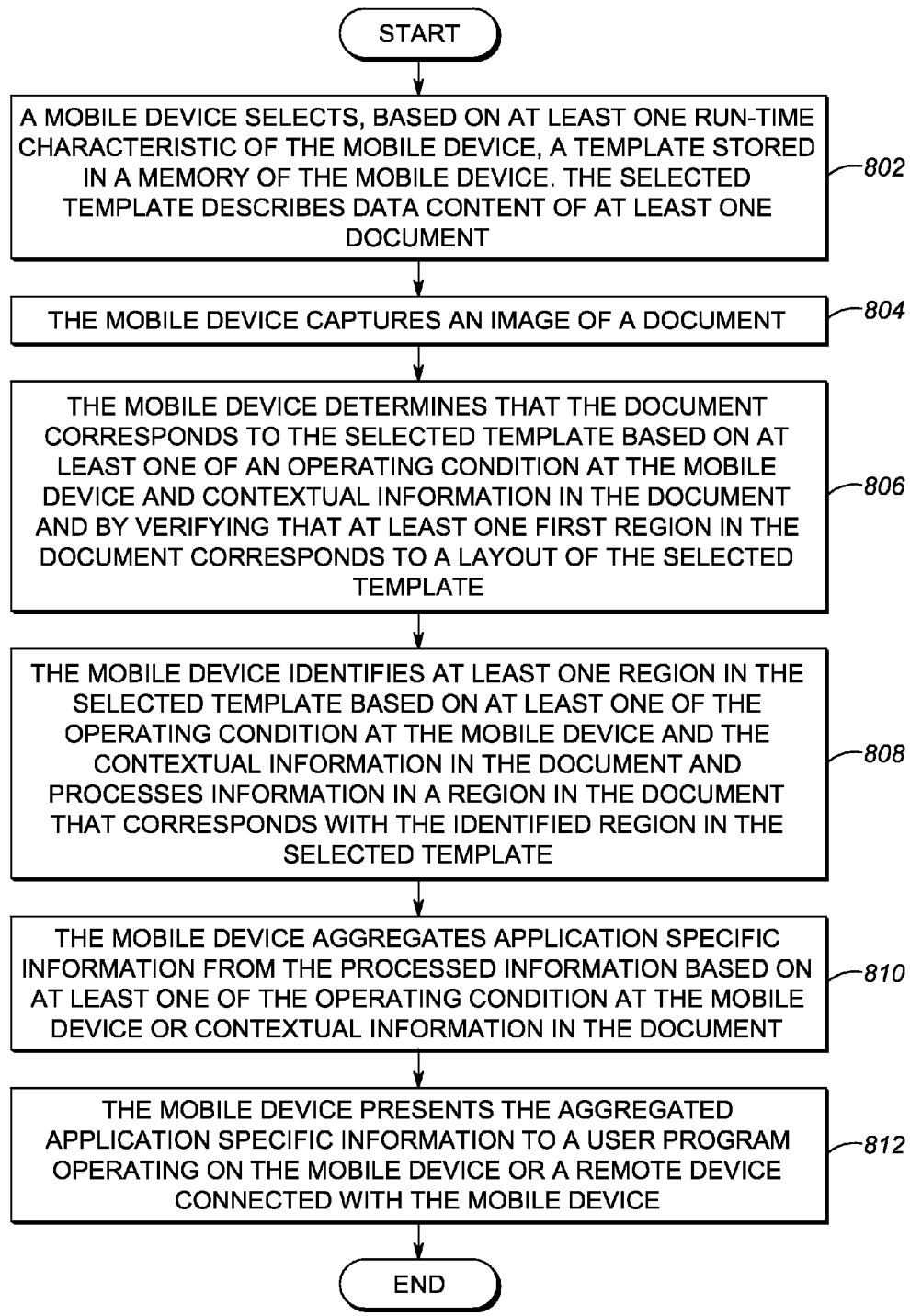
FIG. 8 is another flow diagram of steps used in accordance with some embodiments.

FIG. 8 is another flow diagram of steps implemented in accordance with some embodiments. At 802, a mobile device selects, based on at least one run-time characteristic of the mobile device, a template stored in a memory of the mobile device. The selected template describes data content of at least one document. At 804, the mobile device captures an image of a document. At 806, the mobile device determines that the image corresponds to one document described by the selected template based on at least one of an operating condition at the mobile device or contextual information in the document and by verifying that at least one first region in the image corresponds to a region of the document described by the selected template. At 808, the mobile device identifies at least one region in the image that corresponds with a region in the document described by the selected template, based on at least one of the operating condition at the mobile device or the contextual information in the image, and processes information in the identified region in the image. At 810, the mobile device aggregates application specific information from the processed information based on at least one of the operating condition at the mobile device or contextual information in the document. At 812, the mobile device presents the aggregated application specific information to a user program operating on the mobile device or a remote device connected with the mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method, comprising:
 selecting, by a mobile device based on at least one run-time characteristic of the mobile device, a template stored in a memory of the mobile device, the selected template describes data content of at least one document;

capturing, on the mobile device, an image of a document;
determining, by the mobile device, that the image corresponds to the at least one document described by the selected template based on at least one of an operating condition at the mobile device and contextual information in the document by verifying that at least one region in the image corresponds to the at least one document described by the selected template;
identifying, by the mobile device, the at least one region in the image in correspondence with a region in the at least one document described by the selected template based on at least one of the operating condition at the mobile device and the contextual information in the document;
processing information in the identified region in the image based at least in part on a location of the mobile device, including validating accuracy of a postal address in the identified region in the image based on the location of the mobile device and routing a package to the postal address in the identified region in the image when the location of the mobile device does not correspond to the postal address;
aggregating, by the mobile device, application specific information from the processed information based on at least one of the operating condition at the mobile device and contextual information in the document; and
presenting, by the mobile device, aggregated application specific information to a user program operating on one of the mobile device and a remote device connected with the mobile device.

2. The method of claim 1, wherein the processing information in the identified region in the image comprises processing information in the identified region based on at least one network signal received by the mobile device.

3. The method of claim 1, wherein the processing information in the identified region in the image comprises at least one of recognizing and processing alphanumeric characters, converting check marks or boxes to numerical values, processing an image, converting text to audio, and performing customized decoding on each identified region based on an application being executed on the mobile device.

4. The method of claim 1, wherein the processing information in the identified region in the image comprises performing customized decoding on each identified region based on at least one of the location, an orientation and a proximity of the mobile device.

5. The method of claim 1, wherein the processing information in the identified region in the image comprises performing customized decoding on each identified region based on a coverage area of a network with which the mobile device is associated.

6. The method of claim 1, wherein the processing information in the identified region in the image comprises at least one of: decoding at least one barcode in the identified region and capturing at least one picture associated with the at least one barcode in one decode session, refining the image of the identified region, converting a checked state of at least one check box in the identified region to a numerical value, and identifying alphanumeric characters in the identified region in the image.

7. The method of claim 1, wherein responsive to the presenting, at least one of:
receiving, on the mobile device, feedback on the aggregated application specific information from the user program; and
selecting, by at least one of the user program and a processor on the mobile device, at least one predefined rule for using the aggregated information, based on at least one of the operating condition at the mobile device and the contextual information in the document.

8. The method of claim 1, further comprising associating, by the mobile device, the aggregated application specific information with at least one predefined confidence level and selecting, by at least one of the user program and a processor on the mobile device, at least one predefined rule for using the aggregated information, based on the at least one predefined confidence level.

9. The method of claim 1, further comprising storing information retrieved from the document and using the stored information during processing of another document.

10. The method of claim 1, further comprising:
selecting, by a processor on the mobile device, at least one predefined rule for using the aggregated application specific information; and
executing the at least one predefined rule subsequent to generating the application specific information.

11. A mobile device comprising:
an image capturing device configured to capture information from a document;
a memory for storing a plurality of templates at least one of which is associated with the document;
a processor configured to:
select, prior to the document being captured by the image capturing device and based on at least one run-time characteristic of the mobile device, a template stored in a memory of the mobile device, the selected template describes data content of at least one document;
determine, subsequent to the image of the document being captured by the image capturing device, that the image corresponds to the at least one document described by the selected template based on at least one of an operating condition at the mobile device and contextual information in the document by verifying that at least one region in the image corresponds to the at least one document described by the selected template;
identify at least one region in the image that corresponds with a region in the at least one document described by the selected template based on at least one of the operating condition at the mobile device and the contextual information in the document;
process information in the identified region in the image based at least in part on a location of the mobile device, including validate accuracy of a postal address in the identified region in the image based on the location of the mobile device and route a package to the postal address in the identified region in the image when the location of the mobile device does not correspond to the postal address;
aggregate application specific information from the processed information based on at least one of the operating condition at the mobile device and contextual information in the document; and
present aggregated application specific information to a user program operating on one of the mobile device and a remote device connected with the mobile device.

12. The mobile device of claim 11, wherein the processor is further configured to the process information in the identified region in the image based on at least one network signal received by the mobile station.

13. The mobile device of claim 11, wherein the processor is further configured to process information in the identified region in the image by performing at least one of recognizing and processing alphanumeric characters, converting check marks or boxes to numerical values, processing an image, converting text to audio, and performing customized decoding on each identified region based on an application being executed on the mobile device.

14. The mobile device of claim 11, wherein the processor is further configured to process information in the identified region in the image by performing customized decoding on each identified region based on at least one of a location, an orientation and a proximity of the mobile device.

15. The mobile device of claim 11, wherein the processor is further configured to process information in the identified region in the image by performing customized decoding on each identified region based on a coverage area of a network with which the mobile device is associated.

16. The mobile device of claim 11, wherein the processor is further configured to process information by at least one of: decoding at least one barcode in the identified region and capturing at least one picture associated with the at least one barcode in one decode session, refining the image of the identified region, converting a checked state of at least one check box in the identified region to a numerical value, and identifying alphanumeric characters in the identified region in the image.

17. The mobile device of claim 11, wherein responsive to the presenting, the mobile device is configured to at least one of:
  receive feedback on the aggregated application specific information from the user program; and
  select at least one predefined rule for using the aggregated information, based on at least one of the operating condition at the mobile device and the contextual information in the document.

18. The mobile device of claim 11, wherein the processor is further configured to associate the aggregated application specific information with at least one predefined confidence level and select at least one predefined rule for using the aggregated information, based on the at least one predefined confidence level.

19. The mobile device of claim 11, wherein the processor is further configured to select at least one predefined rule for using the aggregated information and execute the at least one predefined rule subsequent to generating the aggregated application specific information.

20. A mobile device comprising:
  an image capturing device configured to capture an image of a document;
  a memory configured to store a plurality of templates at least one of which is associated with the document;
  a processor configured to:
  select a template stored in the memory, the selected template describes data content of at least one document, prior to the document being captured by the image capturing device;
  determine, subsequent to the image of the document being captured by the image capturing device, that the image corresponds to the at least one document described by the selected template by verifying that at least one region in the image corresponds to the at least one document described by the selected template;
  identify at least one region in the image that corresponds with a region in the at least one document described by the selected template;
  process information in the identified region in the image based on (a) a location of the mobile device, wherein the processor is further configured to validate accuracy of a postal address in the identified region in the image based on the location of the mobile device and route a package to the postal address in the identified region in the image when the location of the mobile device does not correspond to the postal address, and (b) at least one of the operating condition at the mobile device and the contextual information in the at least one document;
  aggregate application specific information from the processed information; and
  present, based on at least one of the operating condition at the mobile device and the contextual information in the at least one document, aggregated application specific information to a user program operating on one of the mobile device and a remote device connected with the mobile device.

* * * * *